Feb. 3, 1970  M. E. G. MATON  3,492,715
GAUGE FOR MEASURING PIPEWORK
Filed Nov. 22, 1967  2 Sheets-Sheet 1
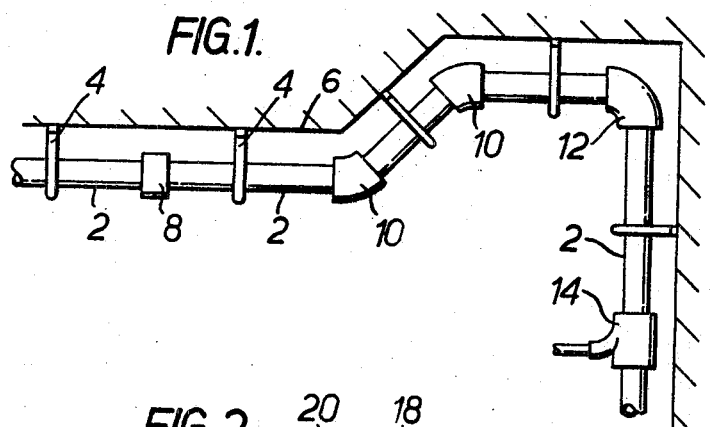
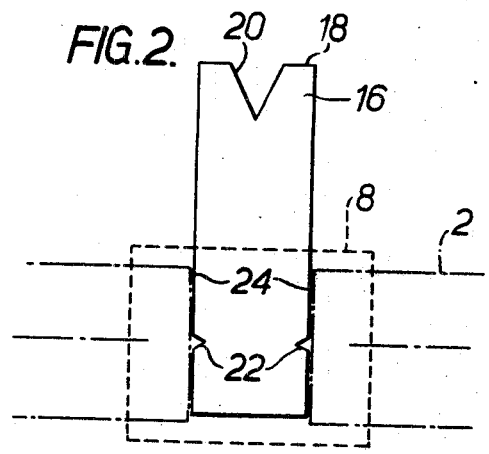
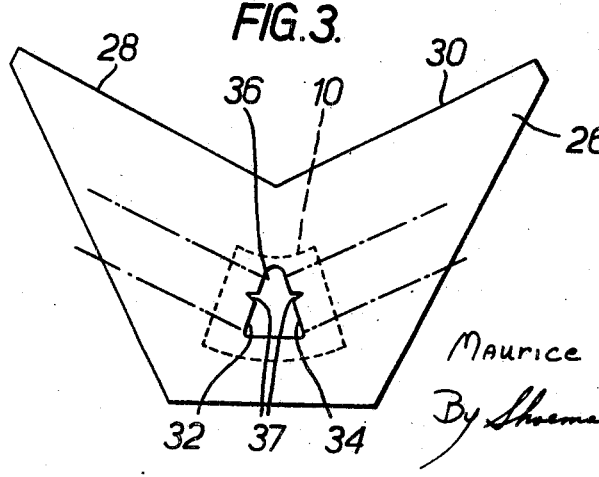
INVENTOR
Maurice E.G. Maton
By Shoemaker and Mattare
Attys.

Feb. 3, 1970 — M. E. G. MATON — 3,492,715
GAUGE FOR MEASURING PIPEWORK
Filed Nov. 22, 1967 — 2 Sheets-Sheet 2

INVENTOR
MAURICE E. G. MATON
By Shoemaker and Mattare
Attys.

United States Patent Office 3,492,715
Patented Feb. 3, 1970

3,492,715
GAUGE FOR MEASURING PIPEWORK
Maurice E. G. Maton, Southampton, England, assignor to Crestshore Engineering Limited, Southampton, England
Filed Nov. 22, 1967, Ser. No. 685,170
Claims priority, application Great Britain, Jan. 16, 1967, 2,225/67
Int. Cl. B23q 17/00
U.S. Cl. 29—407                              14 Claims

ABSTRACT OF THE DISCLOSURE

A gauge for use in measuring the lengths of pipework to be installed in a building, said gauge having a locating edge which is adapted to be brought into contact with the support surface for the pipework and having two indicia which are spaced from the locating edge at a distance corresponding to the desired centre line of the pipework from the support surface, the indicia being spaced apart by a known distance corresponding to the dimensions of the pipe fitting to be used.

---

This invention relates to gauges, particularly for use in measuring the line of pipework to be installed in a building.

A known method of measuring for this purpose involves a pipe-fitter marking the line of the pipes, measuring various distances along the line, and making various calculations on the measurements to allow for the dimensions of the pipe fittings and for the spacing of the pipework from the support surface, to obtain the true length of each straight run of pipework. The fitter then cuts off a calculated length of pipe, and cuts screw-threads on its ends. Unfortunately, a slight error in the calculations can easily result in a length of cut and threaded pipe being too long or too short for its intended position, the inflexibility of the assembled pipework permitting no, or very little, latitude in positioning the pipework. This leads to a high rate of wastage of pipe, and the loss of productive time in repeating the measurements, calculations, cuttting and threading. For these reasons the present accepted rate estimating the cost of installing pipework of 1¼″ diameter is one hour's work for each five feet of run of the pipework.

The present invention aims at increasing productivity by providing a method and means by which no calculations need be made, the length of pipework required being obtained by direct measurement.

Accordingly, the present invention provides a gauge for use in measuring the length of pipework to be installed in a building, comprising at least one edge adapted to locate the gauge by being brought at a chosen location into contact with a support surface for the pipework, and at least two indicia each spaced by a known amount from the or one locating edge or continuation thereof corresponding to the desired spacing of the centre line of the assembled pipework from the support surface, the indicia being spaced apart by a known amount corresponding to the appropriate dimensions of a pipe fitting associated with the respective gauge.

It also provides a method of measuring the line of pipework to be installed in a building, comprising choosing those locations in the run of the pipework at which a pipe has to be joined to a fitting; placing a gauge corresponding to the fitting at each such location, and measuring the distance between predetermined indicia on adjacent gauges, each measurement corresponding to the absolute length of the pipe between the two locations.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 4:
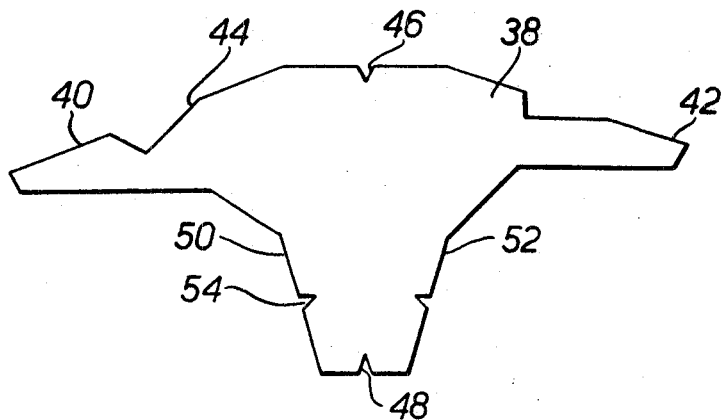
Figure 5:
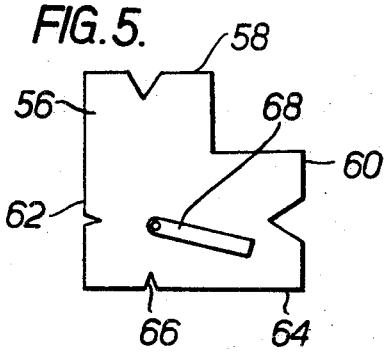
Figure 6:
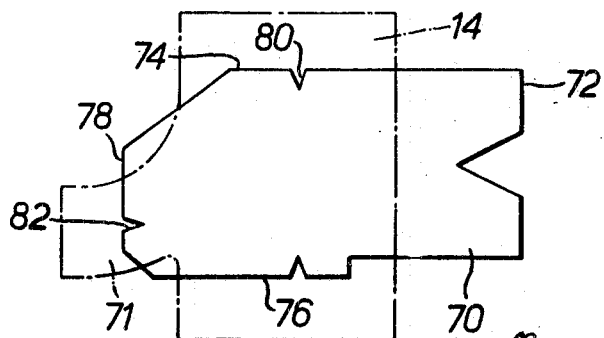

In said annexed drawings:
FIG. 1 is a plan view of part of a building fitted with pipework measured in accordance with the present invention;
FIG. 2 is a plan view of a measuring gauge for a sleeve pipe fitting;
FIG. 3 is a plan view of a gauge for a 45° pipe fitting mounted adjacent to an "external 45°" bend;
FIG. 4 is a plan view of a measuring gauge for use with the same fitting as that used with FIG. 3, but for an "internal 45°" bend;
FIG. 5 is a plan view of a measuring gauge used for an internal 90° bend fitting, and
FIG. 6 is a plan view of a measuring gauge for a "sweep-T" pipe fitting.

The pipework shown in FIG. 1 is of 1¼″ inside diameter and comprises several straight lengths of pipework 2 each supported by means of a bracket 4 from a suitable support surface 6, which may be the skirting board of a room in which the pipework is to be installed.

Starting from the left hand side of FIG. 1, the various pipe fittings are successively a sleeve 8, two 45° bends 10, a 90° bend 12, and a "sweep-T" 14.

The gauge for use with the sleeve 8 is shown in FIG. 2 in solid lines. The sleeve fitting 8 is shown in broken lines; the centre line of the pipework is shown in dot-dash lines, and the adjacent lengths of pipe 2 coupled in the sleeve 8 are shown in dash-dot-dash lines.

The gauge 16 has a locating edge 18 which is intended to be brought into contact with the skirting board 6 at the desired location of the sleeve 8. To assist in this the edge 18 is provided with a notch 20 intended to be aligned with a mark on the skirting board 6, or the adjacent floor. Equally spaced from the edge 18 are two notches 22, each in one of two parallel straight edges 24 perpendicular to edge 18. The distance of each notch 22 from the edge 18 is equal to the distance of the centre line of the pipes 2 from the skirting board when the pipework is fully assembled. The distance between the edges 24 is made equal to the distance between the inner ends of the screw-threaded portions of the sleeve 8. Thus, when each length of pipe 2 is screwed fully home into the sleeve 8, the distance between the ends of the pipes is equal to the distance between the edges 24. Thus, in order to measure the two lengths of the pipe 2 it is sufficient to take all measurements from the respective edge 24, which thereby automatically allows for the dimensions of the sleeve 8. Thus, all calculations involved can be made when the gauge 16, and indeed when all gauges of the present invention, is or are made, thus relieving all users of the gauge from any need for making calculations, or even from knowing which calculations would otherwise have to be made.

The gauge 26 shown in FIG. 3 is for use with a 45° bend fitting 10 which is shown in broken lines in FIG. 3. The respective lengths of pipe 2 are shown in dash-dot-dash lines. The gauge 26 has two locating edges 28 and 30 which meet to form an internal angle of 135°. This angle, differing as it does from 180° by 45°, is known as a 45° bend.

Positioned symmetrically with respect to the bisector of the angle formed by the edges 28 and 30 are two edges 32 and 34 of a cut-out 36 in the gauge 26. Edges 32 and 34 are perpendicular to continuations of edges 28 and 30 respectively. Each of the edges 32 and 34 has in it a notch 37 which is spaced from its respective locating edge by the desired distance between the centre line of the pipes 2 and the skirting board 6. Similarly to gauge 16, the two notches 37 are spaced apart by a distance equal to the spacing between the inner ends of the screw-threaded portions of the fitting 10. Thus, when each length of pipe 2 is screwed into fitting 10, its end is coplanar with the respective edge 32 or 34. Thus, similarly to use of gauge 16, when making measurements with gauge 26, all measurements need to be taken only from the respective edge 32 and 34. In order to measure the absolute length of the pipe 2 extending between sleeve 8 and the bend fitting 10, the gauge 16 is located against the support surface at the desired location, which is determined by other considerations, such as the position of the end of the preceding length of pipe 2 extending to the left, as viewed, of the sleeve 8. The gauge 26 is fitted against the outside bend of the skirting board 6 so that both its locating edges 28 and 30 lie flush against the respective edge of the skirting board. A measurement is then taken of the distance between edge 24 of gauge 16 and edge 32 of gauge 26, and particularly at the respective notches 22 and 37 therein, to obtain the absolute length of pipe 2 which is to extend between the two fittings. Because of the nature of the gauges, when a length of pipe is cut off and its ends threaded, and when the threaded ends are screwed into the respective sleeve 8 and bend 10, the fittings are spaced apart from each other by exactly the desired distance.

The remaining gauges shown in FIGS. 4 to 6 are used in the same manner, and are shaped with the same considerations in mind, and so will not be described in such detail as are gauges 16 and 26.

The gauge shown in FIG. 4 is for use with the same 45° bend fitting 10, but for an internal 45° bend. It thus comprises two locating edges 40 and 42 which meet at an angle of 135°. Each of the edges is interrupted by a cut-out 44 to allow for the fact that most skirting boards or other support surfaces 6 are not truly linear. The gauge 38 is provided with two notches 46 and 48 which lie on a bisector of the angle formed between the edges 40 and 42. Symmetrically disposed relatively to the line between notches 46 and 48 are measuring edges 50 and 52, each provided with a centre line notch 54. It will be appreciated that the edges 50 and 52 correspond to edges 32 and 34 of the gauge 26.

The gauge 56 shown in FIG. 5 is for the 90° internal bend fitting 12. It has two perpendicular locating edges 58 and 60, and two perpendicular measuring edges 62 and 64 each provided with a centre line notch 66. Pivotally mounted on the gauge 56 is a finger 68 which is pivoted at the intersection of the virtual centre lines of the gauge. The finger is pivotable so that it can be selectively brought over one of the notches 66 so that it projects for a chosen length beyond the edge 64 and at right angles to it. The finger 68 is intended to be used when the fitting 12, instead of having two female connections, has one male end. When the male end is used, the fitting is followed immediately by a second fitting having a female connection. Therefore the gauge appropriate to this second fitting is intended to be located against the end of the finger 68, and against the support surface. Further measurements for the piping connected to the second fitting are taken from the respective measuring edge of the second gauge.

The gauge 70 shown in FIG. 6 is for a sweep-T fitting 14, which is shown in broken lines. The fitting has two normal female connections of diameter corresponding to the diameter of the pipe 2, and a female connection of smaller diameter extending at a right angle to the centre line of the main connections of the fitting. The centre line of the third connection is asymmetrically disposed relatively to the two main connections. The third connection is in communication with the interior of the fitting 14 through a curved channel 71 designated the sweep.

The gauge 70 has a locating edge 72, and three measuring edges 74, 76 and 78. Edges 74 and 76 are provided with centre line notches 80, and is thus similar to gauge 16. The edge 78 has a notch 82 which is provided to permit the gauge 70 to be aligned with the path of the smaller-bore tube (not shown) to be connected to the channel 71. As described above, the spacings-apart of the edges 74, 76 and 78 correspond to the respective spacings of the inner ends of the screw-threaded portions of the fitting 14. Thus, in like manner, measurements for the respective lengths of pipe are taken from the respective edge. The corner between edges 74 and 78 is chamfered to indicate the direction of asymmetry of the fitting 14. When it is desired to reverse the fitting 14 so that the flow through it and through the third outlet is in the direction opposite to that shown in FIG. 6, then the gauge 70 is turned upside down before measurements are taken from the respective edges.

Although the gauge of this invention has been described as being used by having its locating edge brought into contact with the support surface, this is not essential and is sometimes not even possible. If the pipework is supported above a floor or suspended from a roof and is not intended to be secured to a vertical surface, then the locating edge is superfluous. What happens in these circumstances is that a centre line notch of a gauge appropriate to the desired fitting is aligned vertically with the centre line and one end of a length of pipework. If the pipework is roof-mounted, this is done by dropping a plumb line, and either marking the floor or using the line directly. Aligning the respective measuring edge or line of the gauge with the actual or virtual end of the pipe ensures that the second measuring edge is correctly positioned to enable the next measurement to be taken by using the gauge.

Each gauge is made of suitable sheet material, such as metal or plastics material. Each measuring indicium may take the form of an edge of the gauge, or it may be in the form of a line printed, engraved or otherwise applied to a surface of the gauge. The locating edges have to be left unobstructed, but the shape of the measuring edges, as long as they are not functioning as measuring indicia, is immaterial.

Each face of the gauge may be provided with data indicating the type and size of fittings for which the gauge was designed.

It will thus be seen that the present invention provides gauges by means of which the dimensions of any standard pipe fitting can be allowed for during the design of the gauge so that in use only direct measurements need to be taken from the gauge. This has the considerable advantage that measuring the line of the pipework to be installed in a building can be left to someone who is not a skilled pipe-fitter, thus increasing productivity. It has been found that in a building to be fitted with a pipework of average complexity, the rate of measuring and installing pipework of 1¼" diameter was increased from the present accepted rate of five feet for each hour to forty to fifty feet for each hour.

I therefore particularly point out and distinctly claim as my invention:

1. A gauge for use in measuring the lengths of pipework to be installed in a building, comprising a body having at least one edge adapted to locate the gauge by being brought at a chosen location into contact with a support surface for the pipework, and at least two indicia each spaced by a first known amount from a line coincident with a location edge said first amount corresponding to the desired spacing of the centre line of the assembled pipework from the support surface, the indicia being spaced apart by a second known amount corresponding to the distance between and relative positions of pipe ends within a pipe fitting associated with the respective gauge.

2. The gauge claimed in claim 1, in which the gauge has on it a third indicium spaced laterally from the other two indicia and corresponding to the appropriate dimension of a third outlet from the respective fitting.

3. The gauge claimed in claim 1, in which when there is only one locating edge, it is provided with a mark for alignment with a mark on the support surface, or surface adjacent thereto.

4. The gauge claimed in claim 1, in which each gauge has two locating edges which meet, or of which continuations meet, at a known angle.

5. The gauge claimed in claim 4, in which each gauge is fitted with a finger which is pivoted at the intersection of the two virtual centre lines of the gauge, and which can be selectively pivoted until it overlies an indicium to project beyond it for a known distance.

6. The gauge claimed in claim 4, in which the gauge is provided with a line, or with two marks which lie on a line, which bisects the external angle of the support surface.

7. The gauge claimed in claim 4, in which the or each locating edge is interrupted to form two spaced-apart aligned portions.

8. The gauge claimed in claim 2, in which each indicium takes the form of a straight line perpendicular to its respective locating edge and provided with a mark indicating the respective centre line.

9. The gauge claimed in claim 8, in which the line is defined by an edge of the gauge.

10. The gauge claimed in claim 9, in which the mark is a notch or other indentation in the edge.

11. The gauge claimed in claim 10, in which the gauge is made from sheet metal.

12. A method of measuring the line of pipework to be installed in a building, comprising choosing those locations in the run of the pipework at which the pipe has to be joined to a fitting; placing a gauge corresponding to the fitting at each such location, and measuring the distance between predetermined indicia on adjacent gauges, each measurement corresponding to the absolute length of the pipe between the two locations.

13. A method of prefabricating pipework for installation in a building, comprising positioning at each of two chosen locations on or adjacent to a support surface for the pipework, two gauges each corresponding to a respective fitting to be secured to the pipework and each carrying at least two indicia positioned according to the dimensions of the pipework and fittings; measuring the distance between two respective indicia on the gauges; cutting off and threading a pipe of length equal to the said distance; screwing it together with the respective fittings, and repeating the process for the successive portions of the runs of pipework.

14. A method of prefabricating pipework to be installed in a building, comprising the positioning of at least several selected locations a gauge as claimed in claim 1; measuring the distance between the nearer indicia on adjacent gauges; cutting off a measured length of pipe; cutting threads on its ends, and screwing it into the fittings which correspond to the respective gauges.

References Cited

UNITED STATES PATENTS

| | | |
|---|---|---|
| 1,134,092 | 4/1915 | Bahr. |
| 3,031,669 | 5/1962 | Lawson. |
| 3,245,201 | 4/1966 | Richardson. |

SAMUEL S. MATTHEWS, Primary Examiner

U.S. Cl. X.R.

33—174